J. BARON.
WHEELED SCRAPER.
APPLICATION FILED APR. 4, 1911.
1,018,954.
Patented Feb. 27, 1912.
2 SHEETS—SHEET 2.
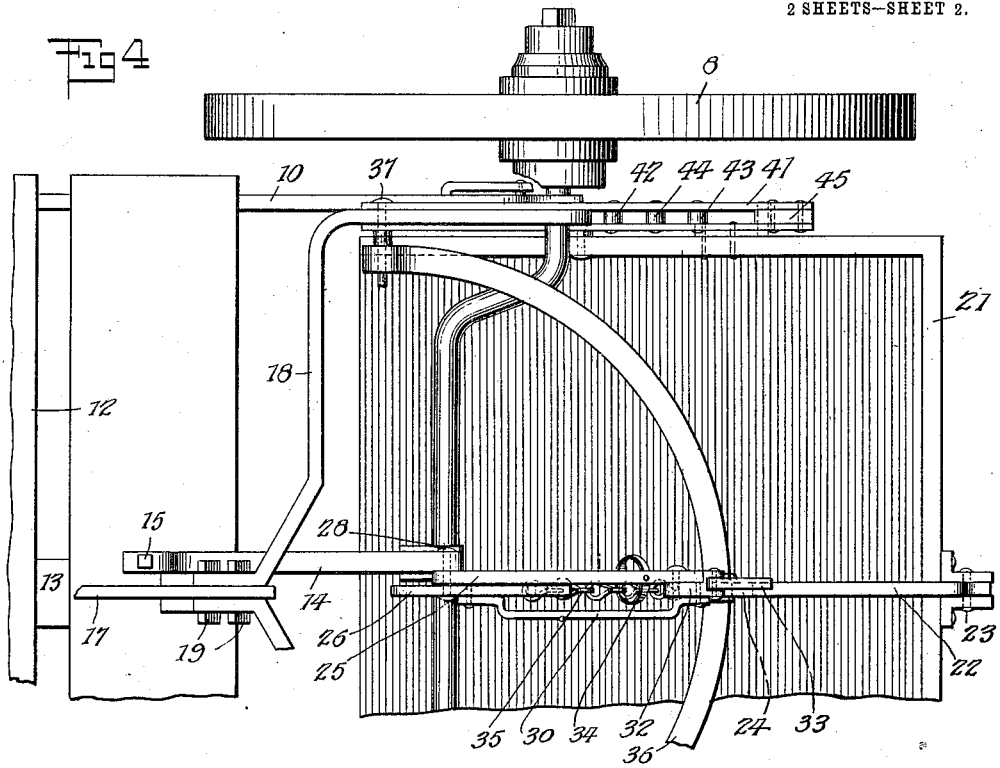
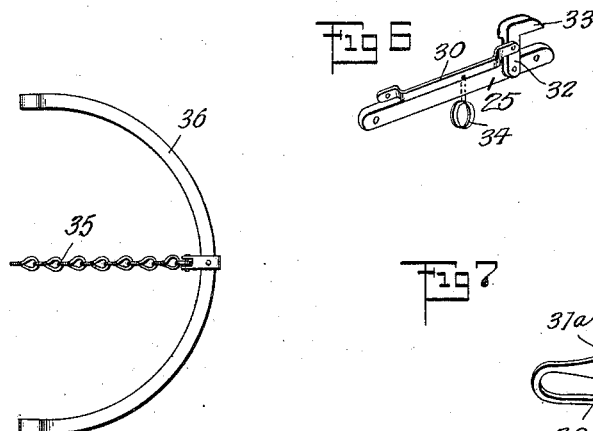
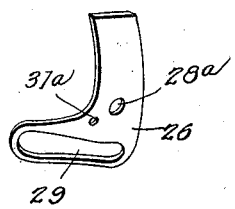
WITNESSES:
C. J. Hackenberg
Walton Harrison
INVENTOR
John Baron
BY Munn & Co.
ATTORNEYS

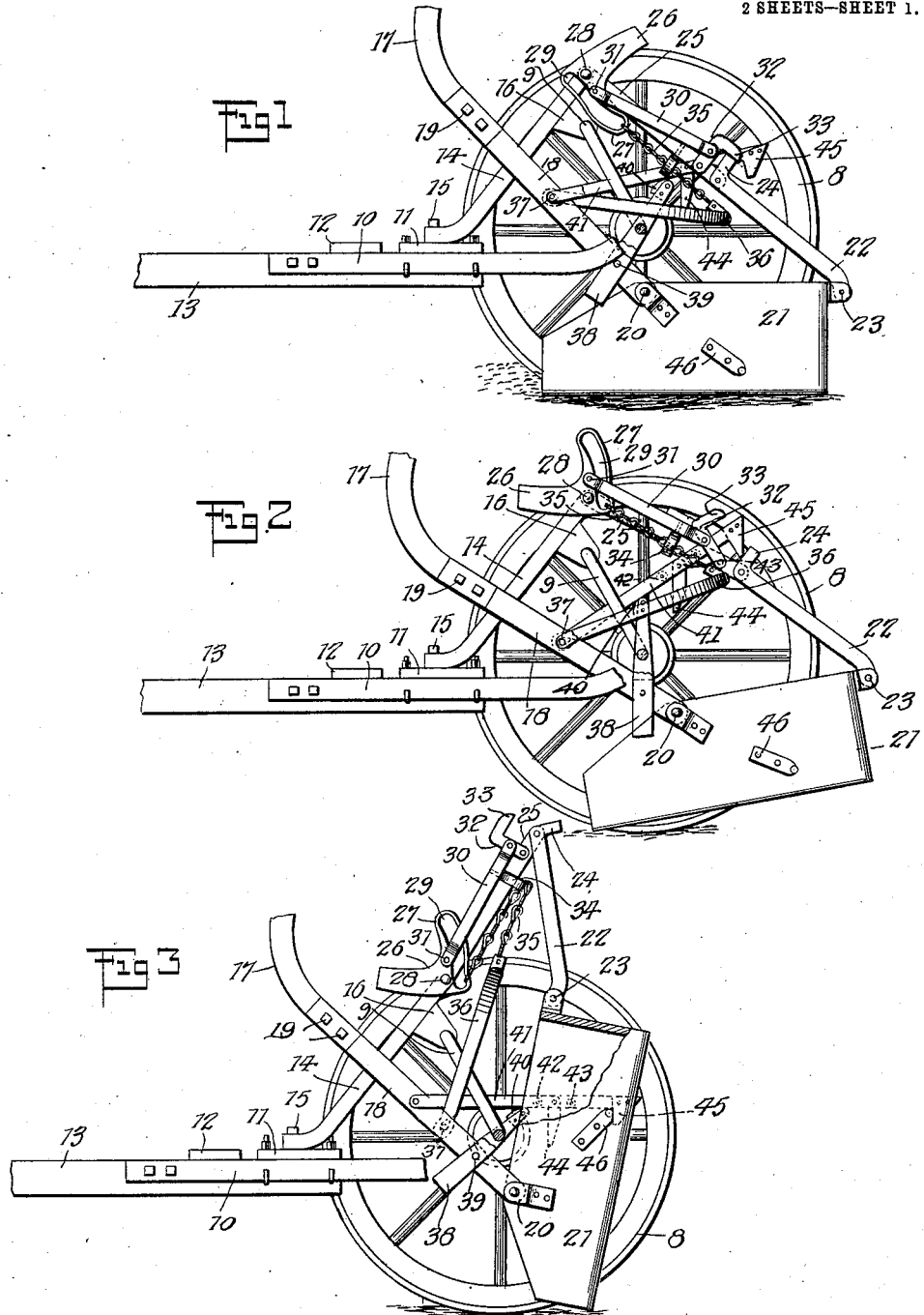

UNITED STATES PATENT OFFICE.

JOHN BARON, OF EL CENTRO, CALIFORNIA.

WHEELED SCRAPER.

1,018,954.   Specification of Letters Patent.   Patented Feb. 27, 1912.

Application filed April 4, 1911. Serial No. 618,782.

*To all whom it may concern:*

Be it known that I, JOHN BARON, a citizen of the United States, and a resident of El Centro, in the county of Imperial and State of California, have invented an Improvement in Wheeled Scrapers, of which the following is a full, clear, and exact description.

My invention relates to wheeled scrapers and more particularly to those of the kind which are drawn along over the ground by horses or other draft animals and are operated by one person.

My invention comprehends improvements whereby the operator may facilitate the dumping of the shovel and at the same time promote his own safety to such an extent that he can use one hand for managing the team and have a full view of the other hand for manipulating the mechanism controlling the shovel—the driver preferably standing upon the foot board in front of the shovel.

More particularly stated I provide a toggle mechanism which is connected to the shovel and to other parts of the machine and controllable by a hand lever in such a manner that the operator by shifting the hand lever from normal to abnormal position can control the toggle mechanism and thus cause the forward movement of the machine to quickly and positively turn the shovel as the latter drags upon the ground.

As is well known in this are wheeled scrapers carrying shovels adapted to be dumped by aid of the forward motion of the machine are usually hard to handle and when employed upon smooth roads or other portions of the ground have a tendency to maintain the shovel in the position in which it is employed for scraping and considerable difficulty is often experienced in causing the shovel to turn at the precise moment when rotational movement is desired by the operator. Moreover the difficulty of causing the shovel to turn at the precise instant subjects the operator to more or less danger as it is impracticable for him to exert great muscular strength and at the same time safeguard his person from accident. Indeed in many of the scrapers now employed if the operator undertakes to shift the hand lever and only succeeds partially in doing so the hand lever is apt to recoil and strike him a blow which may involve serious consequences.

What I seek primarily to do therefore is to provide the wheeled scraper with such mechanism that the operator, by simple easy movements of parts which can be manipulated by one hand, can cause the shovel to be shifted into such a position that the front end of the shovel will bite into the ground and thus insure the positive and accurate turning movement for the shovel, the operator in the meantime being subjected to no undue danger.

Reference is made to the accompanying drawings forming a part of this specification, and in which like numbers indicate like parts.

Figure 1 is a view partly in side elevation and partly broken away showing my improved wheeled scraper with its movable parts occupying their respective normal positions—that is, the positions they occupy while the shovel is in the act of scraping; Fig. 2 is a view partly in side elevation and partly broken away showing various movable parts in the position which they occupy when the cutting edge of the shovel bites into the ground so as to turn the shovel; Fig. 3 is a view showing the same mechanism as Fig. 2 but with the movable parts farther advanced in consequence of the travel of the machine directly ahead, the shovel being in the act of dumping its load and being turned almost to its limit; Fig. 4 is a fragmentary plan view showing the parts as occupying their respective normal positions; Fig. 5 is a detail showing in plan the swinging yoke which by its upward movement actuates the toggle mechanism and thus causes the shovel to be tilted slightly; Fig. 6 is a detail showing in perspective one of the toggle links and parts immediately associated therewith; Fig. 7 is a detail showing in perspective the hand lever for controlling the toggle mechanism.

The machine is provided as usual with a pair of vehicular wheels exactly alike, one of them being shown at 8. These wheels are fitted upon the ends of the axle 9, the middle portion of the axle being arched. Two side bars are provided, one of them being shown at 10, and mounted upon these side bars are foot boards 11, 12 together constituting a small platform upon which the operator stands. The tongue of the machine is shown at 13 and is secured to the foot boards. A post 14 is mounted rigidly upon the foot board 11 by aid of a bolt 15 and extends obliquely backward. This post carries adjacent to its upper end a bearing 16 through which the axle 9 extends. At 17 is a hand lever which is secured to arms 18 by aid of bolts 19, these arms diverging as will be understood from Fig. 4 and together with the hand lever 17 constitute practically a large fork. The lower and rear ends of the arms 18 are by aid of pivot pins 20 journaled upon the shovel 21. A toggle link 22 is connected with the rear end of the shovel 21 by aid of a pivot pin 23. The end of the toggle link 22 opposite that of its pivotal connection with the shovel 21 is provided with an upturned portion 24. Anoother toggle link 25 is pivotally connected with the toggle link 22 and is also pivotally connected with the post 14 which as above explained is fixedly mounted upon the foot board 11. A hand lever 26 provided with an extending portion 27, and having generally the form of a foot, is by aid of a pivot pin 28 mounted upon the upper end of the post 14. The extending portion 27 of the hand lever 26 is provided with a slot 29 slightly curved as shown and having a length nearly equal to that of said extending portion. A link 30 is by aid of a pivot pin 31 connected with the hand lever 26 which is provided with holes 28$^a$, 31$^a$, the pin 28 extending through the hole 28$^a$ and the pin 31 fitting into the hole 31$^a$. A link 32 is pivotally connected with the link 30 and is considerably shorter than the latter and also connects to the link 25. A pawl 33 is pivotally mounted upon the link 32 at the end thereof opposite its pivotal connection with the link 25. This pawl 33 is adapted to swing in either of two directions as will be understood from Figs. 1, 2 and 3. The link 30 carries upon its underside an eye 34 and extending through this eye is a chain 35. This chain at one of its ends is provided with a link which has a portion extending through the slot 29, the chain thus being practically interlinked with the extending portion of the hand lever 26 by aid of the slot 29. The other end of the chain 35 is connected with a swinging yoke 36. This yoke is of massive form and has generally the shape of an arch. It extends almost across the entire width of the scraper and at its ends is journaled upon the arms 18 by aid of pivot pins 37. Two levers 38 are by aid of pivot pins 39 connected with the arms 18. These levers are also journaled upon the axle 9 adjacent to the ends thereof and are provided with shoes 40 carried by their upper or free ends. Two latches 41 are pivotally mounted upon the arms 18 and extend rearwardly therefrom. Each latch 41 carries two bosses 42 and 43 and disposed between the latter is a pawl 44 hanging downward and adapted to swing in two directions as far as permitted by the bosses 42, 43 which thus serve as limiting stops for the pawl. The levers 38 are adapted to tilt relatively to the axle upon which they are mounted and in tilting are adapted to lift the latches 41. Each of these latches is provided with a latch head 45 and adjacent to the path of travel of the latter is a pawl 46 which is mounted rigidly upon the outside of the shovel 21. The action of the latches 41, the pawls 46 and the levers 38 being old and well known, these parts need no description. Suffice it to say that whenever the arm 17 is raised as indicated in Fig. 2 for the purpose of lowering the front end of the shovel 21 the levers 38 are tilted, and the shoes 40 pressing against the under sides of the latches 41 raise these latches, as indicated in Fig. 2. The front end of the shovel now bites into or scrapes against the ground, and as the vehicle moves forward the shovel is turned, upon its front end as a center. This turning of the shovel raises the pivot pins 20, and in so doing causes the levers 38 to swing so that their upper ends move rearwardly and downwardly, thus causing the latches 41 to swing downwardly, by their own weight, into horizontal position. The turning of the shovel also raises the lugs 46 and brings them into engagement with the latches, as indicated in Fig. 3, the shovel being for the moment thus prevented from turning backward. The link 30 (see Fig. 4) is bent slightly away from its supports for the purpose of affording room for the eye 34, the chain 35 and parts immediately adjacent thereto.

The operation of my device is as follows:—Assuming that the normal condition of the machine is that which it assumes while the shovel 21 is in the act of scraping, the various movable parts are shown in normal positions in Fig. 1. The swinging yoke 36 now occupies a plane which is nearly horizontal, the rearmost portion of the yoke being at the lowest point it can assume—or in other words as low as the length of the chain 35 will permit. The toggle links 22, 25 are now in precise alinement. The pawl 33 rests upon the upturned portion 24 of the link 22. The latches 41 are raised. The shovel 21 is horizontal and rests upon the ground so that its cutting edge may scrape the latter. The hand lever 17 is raised at its forward end. The hand lever 26 is in such position that the chain 35 extends from the end of the slot 29 farthest from the pivot pin 28, the extension of the hand lever 26 now lying rearwardly and backwardly from the pivot pin 28. Suppose now that the operator wishes for the shovel 21 to bite into and spill its contents upon the ground. The operator, as above stated, is standing upon the platform comprising the two foot boards 11, 12. He grasps the hand lever 26 and turns it forwardly—that is, in a counter clockwise direction according to Fig. 1. The pawl 33, first resting upon the upturned portion 24 of the link 22, is thus drawn forward and now serves to prevent retrogade movement of the lever 26 and the latter is compelled to stay in the new position thus conferred for the moment upon it by the hand of the operator. The tilting of the hand lever 26 draws the chain 35 obliquely upward to the left according to Fig. 1 so that the chain as a whole moves, in the general direction of its length, toward the pivot pin 28. In doing this, the chain lifts the rearward or free end of the yoke 36 and this yoke thereupon swings upwardly upon the pivot pin 28 considered as a center. The yoke in making this movement strikes abruptly against the side of the toggle links 22, 25 which act as a toggle joint. This joint is bent slightly, at the point of pivotal connection between the links 22, 25 by the upward stroke of the yoke 36. The said upward stroke of the yoke 36 also throws the pawl 33 upwardly and forwardly so that this pawl lodges against the adjacent upper face of the toggle link 25. The toggle joint, being thus bent upwardly at its proximate middle— that is, at the point of pivotal connection between the two links 22, 25 causes a slight tilting of the shovel 21. The shovel therefore at its front or cutting edge bites slightly into the ground as will be understood from Fig. 2. This being done, the forward motion of the machine causes the shovel to turn abruptly and spill its contents as will be understood from Fig. 3. The center of the toggle joint is thus lifted to a considerable distance or in other words the toggle links 22, 25 are made to assume an acute angle relatively to each other as will be understood from Fig. 3. This movement of the toggle links causes the chain 35 to bend backward upon itself at the point where it extends through the eye 34. The chain thus supported between its ends by the eye 34 now sustains the rearward portion of the swinging yoke 36 and holds the yoke in its tilted position indicated in Fig. 3. The shovel 21 continues to turn until it attains the final position generally reached by a shovel of this type and continues in such position until the operator restores it by aid of the hand lever 17 to the normal position indicated in Fig. 1. The operator by tilting the hand lever 26 by hand restores this lever to its position indicated in Fig. 2, and in doing this the yoke 36 is lowered and the toggle links 22, 25 and the pawl 33 assume their respective positions indicated in Fig. 1. This position is assumed rather abruptly owing to the weight of the swinging yoke 36 and of the various other movable parts. The abruptness of the movement causes the pawl 33 to be thrown quickly over into its normal position indicated in Fig. 1.

While for convenience I show merely a single form of wheeled scraper, I do not limit myself to this particular form, the scope of my invention being commensurate with my claims.

While as above indicated the mechanism is practically under direct control of the operator, the work aside from mere control is practically automatic in so far as efforts of the operator are concerned; that is to say, the forward motion of the vehicle does the work of turning the scraper. The yoke carried by the scraper causes the front or cutting edge of the scraper to bite into the ground and the only muscular effort needed to be exercised by the operator is the tilting of the hand lever 26 and the consequent bending of the toggle mechanism to a slight extent due to the lifting of the swinging yoke 36 against the under side of the toggle links. If desired, a latch may be placed upon the lever 26 for the purpose of normally holding it in the position indicated in Fig. 1. The movements of the eye 34 carried by the toggle link 30 are such as to virtually take up and pay out the chain 35 or at least to lift the middle portion of this chain so as to keep it out of the way of other supports.

Having thus described my invention, I claim as new and desire to secure by Letters Patent:—

1. A device of the character described, comprising a frame to be moved forwardly upon the ground by aid of draft animals or the like, a shovel connected with said frame and drawn upon the ground, said shovel being mounted to tilt, mechanism connected with said frame and said shovel for preventing said shovel from tilting prematurely, a swinging yoke for controlling said mechanism, and means controllable at will for actuating said swinging yoke.

2. The combination of a frame adapted to be drawn upon the ground by draft animals or the like, a shovel carried by said frame and adapted to tilt, toggle mechanism connected with said frame and with said shovel for preventing premature tilting of said shovel, a swinging yoke supported by said frame for the purpose of actuating said toggle mechanism, an eye carried by said toggle mechanism, a hand lever carried by said frame and provided with a slot, and a flexible connection extending from said yoke through said eye and engaging said hand lever, said flexible connection being movable relatively to said hand lever by aid of said slot, said flexible connection being controllable by movements of said hand lever for the purpose of swinging said yoke in order to actuate said toggle mechanism.

3. In a wheeled scraper, the combination of a movable frame adapted to be drawn upon the ground by draft animals or the like, a shovel carried by said frame and adapted to be tilted, a toggle joint connected with said frame and with said shovel for the purpose of preventing said shovel from tilting prematurely, mechanism for locking said toggle joint, and means controllable by the operator for unlocking said toggle joint abruptly in order to enable said shovel to tilt.

4. A device of the character described, comprising a frame mounted upon vehicular wheels and adapted to be drawn upon the ground by draft animals or the like, a shovel supported in part by said frame and pivotally mounted so as to turn, a pair of toggle links connected together and forming a toggle joint, the ends of which are connected respectively with said frame and said shovel for the purpose of preventing said shovel from tilting prematurely, and mechanism controllable by hand and including a movable member for striking said toggle joint abruptly in order to cause said shovel to bite into the ground and turn by aid of the forward motion of said frame.

5. A device of the character described, comprising a frame adapted to be dragged along the ground by draft animals or the like, a shovel carried by said frame and adapted to be tilted, mechanism connected with said frame and said shovel for preventing said shovel from tilting prematurely, and means controllable at the will of the operator for throwing said mechanism into and out of action, the said means comprising a swinging member, a hand lever, and a flexible connection between the hand lever and the swinging member, the said connection engaging said mechanism.

In testimony whereof I have signed my name to this specification in the presence of two subscribing witnesses.

JOHN BARON.

Witnesses:
B. SALOMON,
C. H. SMITH.

---

Copies of this patent may be obtained for five cents each, by addressing the "Commissioner of Patents, Washington, D. C."